[11] 3,626,140

| [72] | Inventor | Jean-Pierre Peyrot<br>8, domaine du Bel-Abord, Chilly-Mazarin, Essonne, France |
|---|---|---|
| [21] | Appl. No. | 865,139 |
| [22] | Filed | Oct. 9, 1969 |
| [45] | Patented | Dec. 7, 1971 |
| [32] | Priority | Oct. 10, 1968 |
| [33] | | France |
| [31] | | 169492 |

[54] WELDING IN DEPTH
3 Claims, 18 Drawing Figs.

[52] U.S. Cl.................................................219/121 EB,
219/121 EM, 219/121 L
[51] Int. Cl............................................... B23k 9/00
[50] Field of Search............................................ 219/121,
121 EB, 121 L

[56] References Cited
UNITED STATES PATENTS

| 2,858,795 | 11/1958 | Walker.......................... | 34/92 |
| 2,987,610 | 6/1961 | Steigerwald.................. | 219/117 |
| 3,131,289 | 4/1964 | Hansen......................... | 219/121 |
| 3,151,231 | 9/1964 | Steigerwald.................. | 219/121 |
| 3,165,619 | 1/1965 | Cohen........................... | 219/121 |
| 3,448,240 | 6/1969 | Steigerwald.................. | 219/121 |

Primary Examiner—R. F. Staubly
Assistant Examiner—Gale R. Peterson
Attorney—Karl W. Flocks ABSTRACT: A method of welding together two elements with an electron bombardment beam, comprising the following steps: preparing each of the two parts to be welded with a supporting toe and a chamfer, the assembly of the chamfers of the two parts, when the supporting toes are in contact with each other, having a ratio of the depth $p$ to the width $l$ at least equal to 10, the width $l$ not exceeding 5 mm.; effecting, by means of the beam of an electron gun, the welding of the surfaces of the supporting toes in order to assemble the parts in contact along the said supporting toes; progressively filling the chamfer with a metal filler; welding the said metal filler to the surfaces of the chamfer.

WELDING IN DEPTH

The present invention relates to the assembly of parts by welding in depth, and more particularly to a method of welding with filler metal by electron bombardment which permits welding to be carried out on flat or on curved metal sheets separated by a very narrow groove.

A method according to the invention comprises the following steps: preparing the edges of the parts to be welded in such manner that the welding chamfer is very narrow, its width not exceeding 5 mm., whereas its depth is at least equal to 10 times its width; feeding a filler metal progressively or noncontinuously into the groove; and causing a deflection, which may possibly be oscillatory, of the beam of electrons in the interior of the welding chamfer so as to obtain welding of the filler to the edges of the parts to be welded.

The filler metal is utilized in the form of a metallic strip, the width of which is arranged along the height of the chamfer; the oscillation of the beam is effected by means of a device the position of which is fixed to that of the gun and which penetrates into the interior of the chamfer.

The invention has the effect of improving the quality of such assemblies, of considerably reducing deformation due to welding, of increasing the speed of welding, and its application is not limited by the thicknesses of the parts to be welded.

The present invention also relates, by way of new industrial products, to certain assemblies of heavy boilerwork obtained by this method and the assemblies or parts of assemblies produced by means of the steps of the method according to the invention.

Other characteristic features and advantages will be brought out in the description which follows below, given with reference to the accompanying drawings and describing purely by way of indication and not in any limitative sense, one form of embodiment of the invention.

According to the invention, in order to assemble together two pieces of considerable thickness by welding, the method of procedure is as follows, or is similar thereto.

Figure 1:
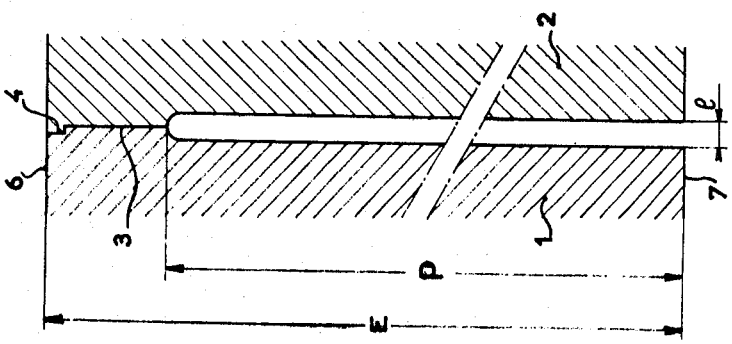

There can be seen in FIG. 1 two parts 1 and 2 which are to be assembled together by welding. The welding chamfer is prepared with a supporting toe 3, either with straight edges or preferably with a slight rebate 4 permitting centering of the parts when so required, two parallel edges delimiting the opening 5 of the chamfer, the width of which is maintained for example below 5 mm. for the parts 1 and 2 to be welded, having a thickness E greater than 150 mm. The ratio between the depth of the chamber $p$ (without counting the supporting toe 3) and its width $l$ may be at least equal to 10. The lower limit of width of the chamfer may be of the order of 1 mm. with the method according to the invention; it depends essentially on the qualities of the electronic optical system.

The parts being placed in a good position with respect to each other, the first phase of welding corresponds to that which is currently termed the bottom pass, and two cases can be considered, depending on whether the faces 6 and 7 are both accessible at the moment of welding or whether only one of them is accessible.

Figure 3:
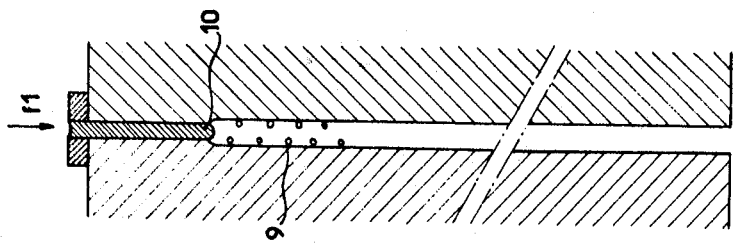
Figure 2:
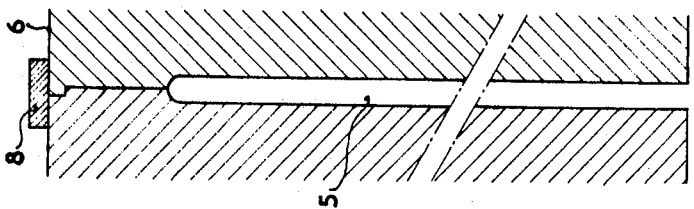

In the first case in which the two faces are accessible (FIGS. 1 to 5), the welding can be started flat on the face 6, after care has been taken to place on this face 6 of the joint a billet 8 of metal, the purpose of which is to avoid subsequent machining which would be necessitated by the presence of channels (see FIG. 3). After welding by this first pass in the direction of the arrow $f_1$, which penetrates completely into the supporting toe 3 of the two parts 1 and 2, the billet is eliminated by grinding (see FIG. 4) and any possible projections 9 are removed by scraping which is also applied to the rear face of the welding bead 10 which may have an irregular surface.

Figure 5:
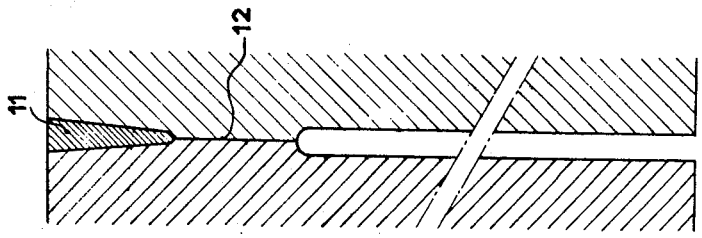
FIGS. 1 to 5 are views in cross section of the preparation of an assembly according to the invention.
Figure 4:
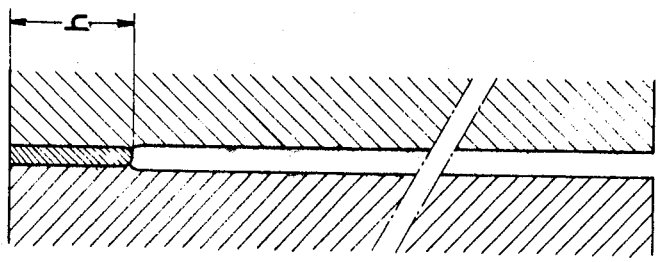

The state is then reached as shown in FIG. 4. FIG. 5 shows an alternative form in which the penetration of the welding only affects a portion 11, which is slightly greater than half the height of the supporting toe 12.

The depth of this first pass $h$ varies according to the electron guns utilized. It would be about 20 mm. to 30 mm. for a gun of 10 kw. with a speed of welding of the order of 50 cm. per minute on stainless steel.

The maximum penetration obtained in a single pass is limited by the power and the performance of the electron gun, and also by the quality of the weld. This quality depends, among other things, on the power applied and on the content of dissolved gas or of volatile elements in the metal. Experience has shown that at the present time a sound penetration of 50 mm. can be obtained on stainless steel with certain guns of about 60 kw., at a speed of welding of the order of 1 meter per minute.

The welding deformation during this first pass is limited to a shrinkage of the order of 3/10ths of a millimeter for unclamped parts of stainless steel, and for a width of molten metal (or width of bead) of about 3 mm. This shrinkage can be predetermined with accuracy and is not accompanied by any opening or angular deformation when the straight section of the bead 10 has parallel edges. It is known that this welding by electron bombardment is carried out under secondary vacuum or even under primary vacuum provided that the accelerator portion of the electron gun 13 (between cathode and anode for a gun of the PIERCE type) is maintained under secondary vacuum. For carrying into effect the welding, which is not illustrated here, it is preferred in the case of heavy or extremely bulky parts to move the gun with respect to the parts, and it is desirable to employ clamping chambers in which the vacuum chamber is limited to the joint of the weld and to its immediate vicinity on each of the faces of the parts.

If this first welding pass starting from the face 6 was carried out with the conventional arc with a tungsten electrode without filler metal (TIG method), the maximum penetration would be limited to about 8 mm. with a width of molten zone of the same order, on an edge-to-edge joint, without chamfer. Under these conditions, the stresses or deformations on unclamped parts are greater although they are acceptable in many cases. However, this depth of penetration may be considered insufficient whenever it is necessary to displace very heavy parts, in order to continue the welding of the full thickness from the other face 7. It is obviously possible to complete this first welding phase by a few passes with filler metal from the same face, in order to obtain a welded thickness of about 20 mm., which permits practically any handling, even that of very heavy parts.

Figure 6:
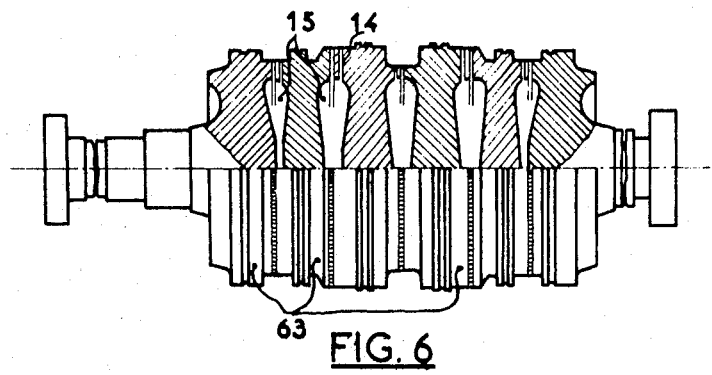
FIG. 6 is a view partly in section of a conventional turbine rotor composed of an assembly of a number of forged parts.

If only a single face is accessible, for example in the case of welding of turbine rotors which are formed by the assembly of a certain number of forged parts 63 of considerable thickness (see FIG. 6), the only known technique of assembly is that of arc welding which necessitates a few holes 14 opening into the individual cavities 15, these holes being intended to permit a protection to be applied behind the bath of molten metal by the introduction of a gas, and also to permit visual examination.

Figure 8:
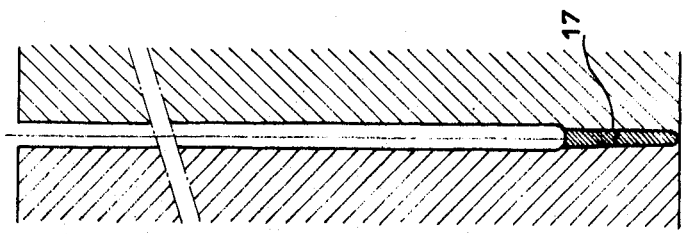
FIGS. 7 and 8 are views in cross section of two stages of the preparation of the welding according to the invention of two elements of a turbine rotor without access from the interior.
Figure 7:
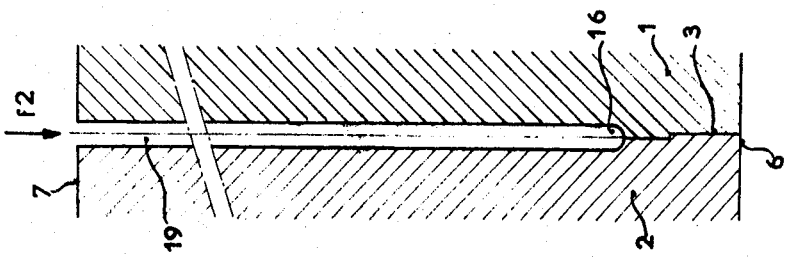

By utilizing these holes to create a vacuum inside the cavities 15, welding can be effected by electron bombardment starting from the face 7 (see FIG. 7). The beam strikes the bottom of the chamfer 16 on the toe 3 serving as a support for the parts 1 and 2. In this case, as the face 6 is not accessible, it is not possible to effect a subsequent grinding operation behind the bead 17, and the welding parameters must therefore be regulated in a very exact manner so as to obtain a regular rear side (see FIG. 8).

Figure 10:
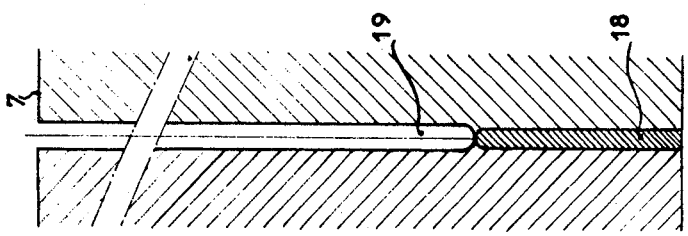
FIGS. 9 and 10 are similar views of a welding operation with access to both faces.
Figure 9:
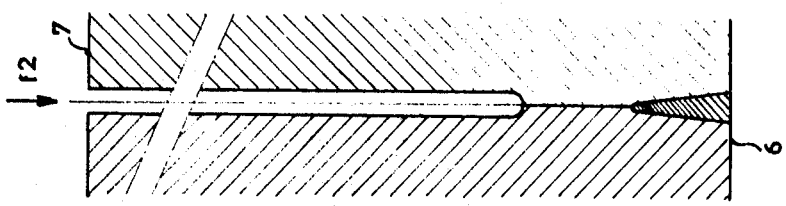

In FIGS. 9 and 10 there is shown an alternative form utilizing the same technique, but assuming that access is possible to faces. A first pass starting from the face 6 having been made (FIG. 5) the part is turned over (FIG. 9) and the toe is completely welded without filler metal from the face 7 (FIG. 10) in the direction of the arrow $f_2$.

When the bottom pass 18 has been completed, the chamfer 19 must be filled. This chamfer is particularly narrow; as has already been stated, it follows that the welding deformation is thereby reduced, as is also the stress condition. Such configurations do not lend themselves to welding in the present state of the art.

The method according to the invention utilizes electron bombardment, taking advantage of the fact that the electron beam is to some extent refocused in the interior during its passage inside the chamfer and that the frontal distance or working distance between the lower face of the last focusing lens and the surface of the molten bath is not limited in practice, since it is known that certain welds have been carried out at a distance of more than 900 mm. from the gun.

The filling of the chamfer is carried out in known manner by means of a filler metal.

An advantage of electron bombardment is that it does not require any protecting flux or slag which it would be extremely difficult to eliminate between each welding pass in such a narrow chamfer. Another advantage is the claim of welding and the quantity of metal melted which it is possible to obtain, in view of the high power which is then locally available.

Figure 12:
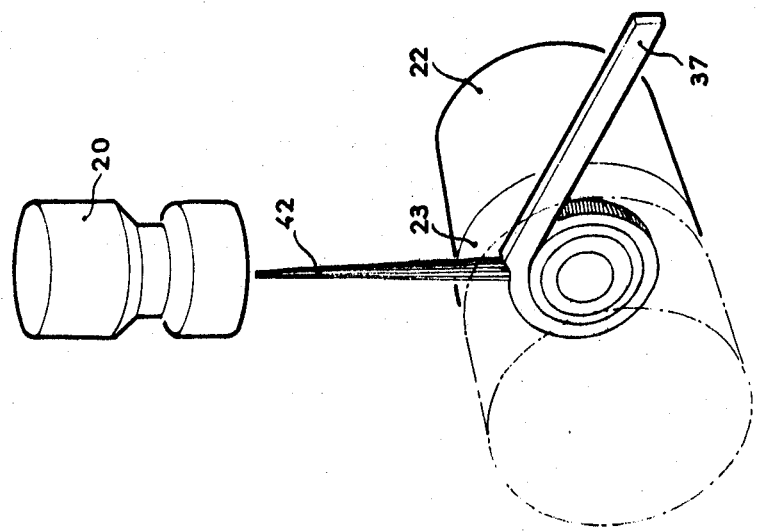
FIG. 12 is similar view of a cylindrical weld.
Figure 11:
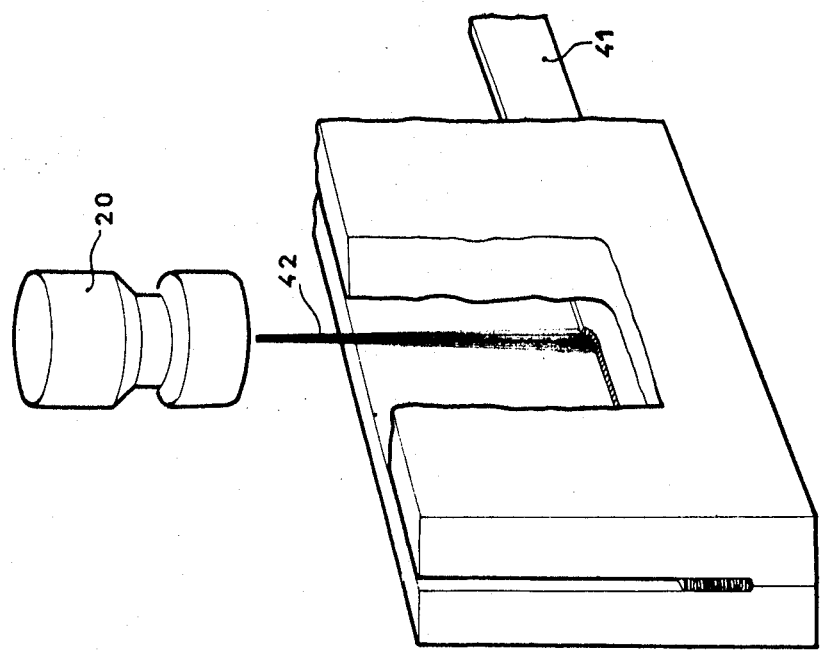
FIG. 11 is a diagrammatic view with parts broken away, of the course of welding of a straight weld by electronic bombardment according to the invention.

According to the invention, the filler metal is preferably a metallic strip, the thickness of which is in the neighborhood of the width of the chamfer. This filler metal is then put in position before each welding pass (FIG. 11), or it is supplied in a continuous feed (FIG. 12). The addition of metal in metallic strip form makes it possible to utilize better the high power which it is possible to deliver by electron beams and thus to carry out welding passes having a substantial thickness. FIGS. 11 and 12 give an indication of these two methods of operation and are respectively applied to a weld in a straight line chamfer and a weld in a cylindrical chamfer.

Figure 13:
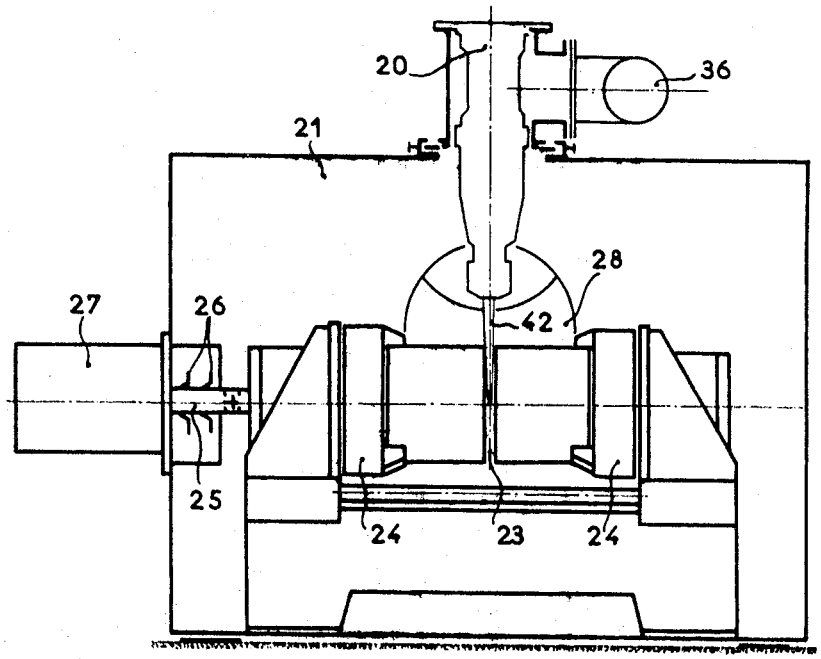
FIG. 13 is a view in elevation of the rear of a welding machine which applies the method of the invention.
Figure 14:
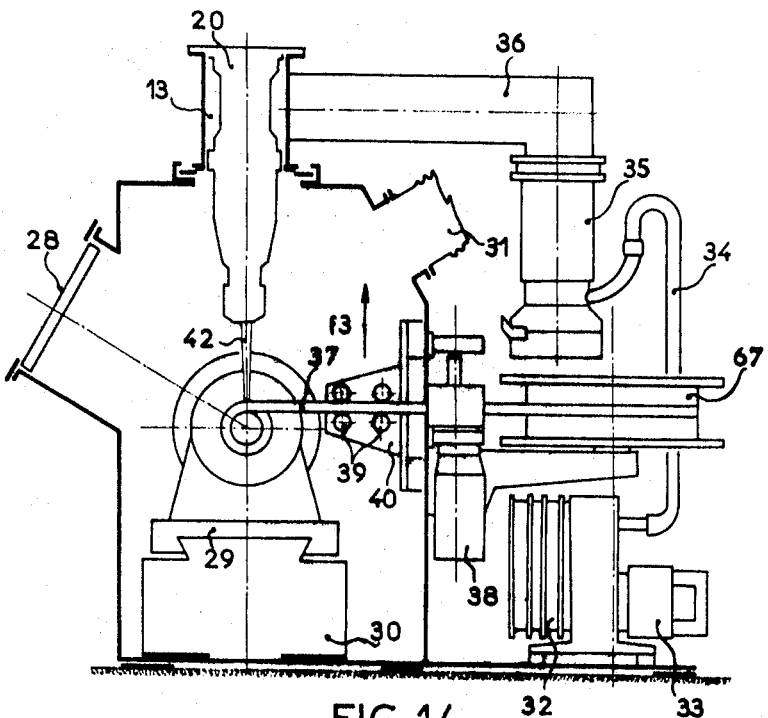
FIG. 14 is a view in side elevation of the machine shown in FIG. 13.

FIGS. 13 and 14 show a diagrammatic general arrangement of a machine for effecting a cylindrical welding operation in a vacuum chamber containing the parts to be welded, as described below.

There can be seen from FIG. 13 an electron gun 20 emitting into a chamber 21 under primary vacuum, in which the part 22 to be welded, having an annular chamfer 23 which is to be filled, can rotate between the holding mandrels 24. The driving shaft 25 passes into the chamber 21 through hermetic sealing joints 26 and is driven in rotation by a motor 27.

The welding operation is supervised through an inspection window 28, the driving system being mounted on a table 29 arranged to slide on a bench 30.

The primary vacuum is effected by a conventional source 31 of primary vacuum, while a standard ROOTS pump 32, driven by a motor 33 provides, through a sleeve 34 and the secondary bump proper 35, a secondary vacuum in the acceleration space 13 through the conduit 36.

The metallic filler in the form of a strip 37 is supplied from a winding reel 67.

The strip 37 driven by a motor 38 passes between rollers 39 mounted on an apparatus 40 which moves gradually upwards during the course of the filling operation, in the direction of the arrow $f_3$.

Figure 16:
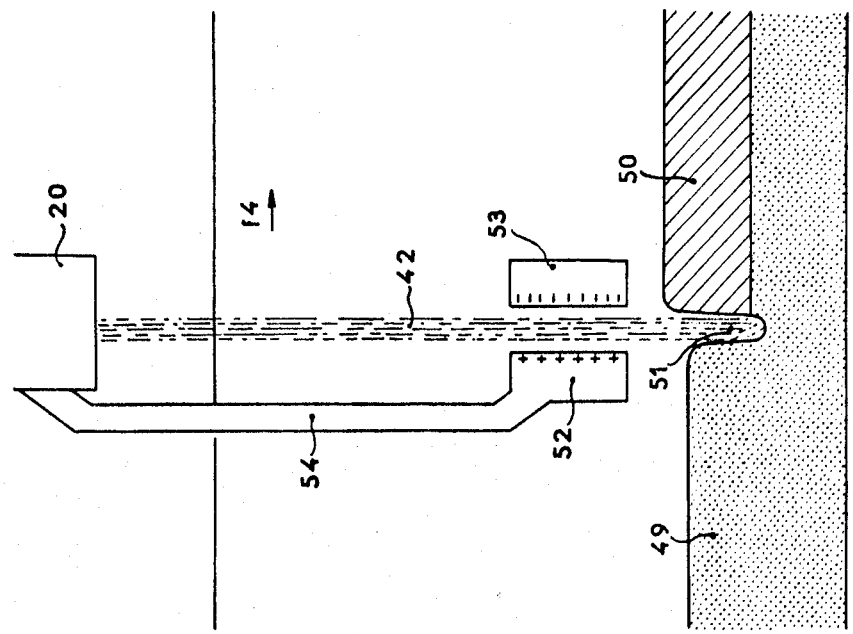
FIGS. 15 and 16 are two diagrammatic views in quadrature of a welding operation according to the invention with deflection of the electron beam by a magnetic field.
Figure 15:
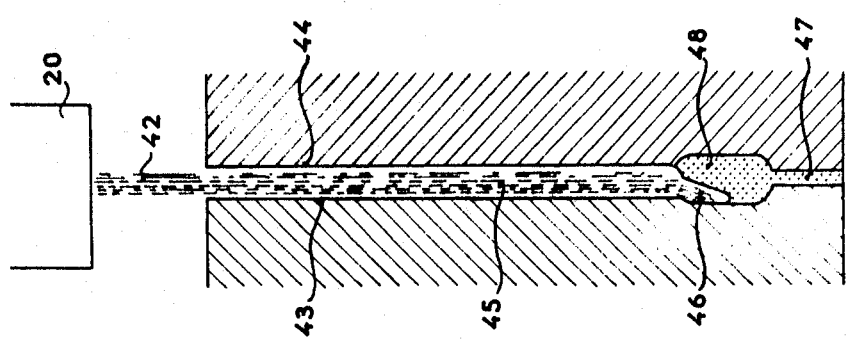

A difficulty which arises is to achieve the binding of the filler metal 37 (or 41) in a satisfactory manner to the walls of the chamfer 19. Simple sticking effects are to be feared when a lack of fusion takes place locally on the surface of the chamfer. The method of remedying this in accordance with the invention is to be able to bring the beam 42 close to the surface 43 or 44 of the chamfer, at the level of the bath of molten metal (FIGS. 15 and 16). In view of the depth and the narrowness of the chamfer, this operation cannot be effected in any satisfactory manner by movement of the gun 20, while furthermore a refocusing of the beam should take place in the interior of the chamfer.

To this end, the invention effects a deflection of the beam 42 from a level 45 located deep inside the interior of the chamfer and as close as possible to the point of effective fusion, the electron beam being thus incurved. This curving of the beam makes it possible to produce welds of good quality by concentrating the energy in the cavities 46 with walls of molten metal, close to the faces 43 and 44 of the chamfer.

When so desired, an oscillation is produced in order that the bath may be deflected from one edge to the other during the course of welding. In FIG. 15 there has also been indicated the form of the welding bead with its bottom pass 47 and the beginning 48 of the filling operation.

The deflection is caused by modifying the electromagnetic field in the interior of the chamfer by means of a miniaturized device which penetrates into the interior of the chamfer. In FIG. 16, there is shown a weld carried out in the direction of the arrow $f_4$. This figure represents a view in cross section taken along the bisecting line of the chamfer. The parts are already welded at 49; the beam moves over the filler metal 50, the cavity 51 being formed with its walls of molten metal, under the impact of the electron beam 42. Two pole-pieces 52 and 53, constituted by magnets of ferrite for example, create a magnetic field which deflects the beam in a direction perpendicular to the plane of FIG. 16, that is to say towards one of the faces of the chamfer. The magnets 52 and 53 are supported by an arm 54 coupled to the gun 20.

Figure 17:
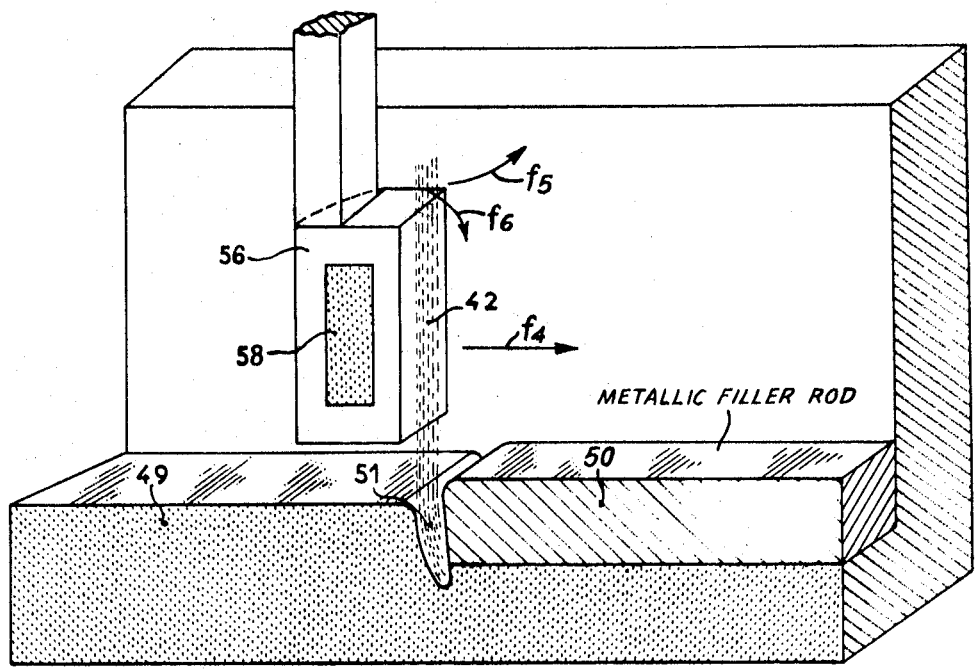
FIG. 17 is a view similar to that of FIG. 16, but in perspective, showing the oscillation of the beam in an electric field.
Figure 18:
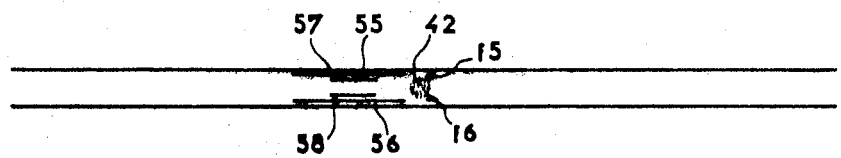
FIG. 18 is a view from above of the device of FIG. 17, showing the electron beam with a negative polarity of one of the plates, which create an electric field.

There may also be utilized a further miniaturized device which creates an electric field perpendicular to the faces of the chamfer. This device is composed of two insulating plates 55 and 56 (see FIGS. 17 and 18) which respectively carry two conducting deposits 57 and 58 which are alternately negatively polarized and thus repel the beam 42 in the direction of the arrows $f_5$ and $f_6$ in turn. FIG. 17 in a perspective sectional view shows a bisecting cross section of the chamfer, in which there can be seen a weld with a filler metal 50 corresponding to a negative polarization of the conducting deposit 57 of FIG. 18.

I claim:

1. A machine for welding parts prepared with a narrow deep groove between them and utilizing an electron beam and successive metal fillers comprising
    at least one chamber under vacuum,
    an electron gun with its electron beam operating in said chamber,
    means to hold and move the parts to be welded,
    means to present filler material successively into the groove in the path of said electron beam,
    means to deflect the end of said electron beam alternately against each of the walls of the groove including
    a pair of polar pieces being narrower in width than the groove, positioned in the bottom portion of the groove,
    an arm thinner than the width of the groove extending into the groove with said polar pieces attached thereto and attached at its opposite end to said electron gun.

2. The welding machine in accordance with claim 1, further characterized by
    said means to hold and move the parts to be welded including
    a motor, a driving shaft connected to said motor and passing into said chamber through hermetic sealing joints,
holding mandrels adapted to hold the parts to be welded,
a base with a slide mounting said holding mandrels thereon,
said driving shaft cooperating with said means to present filler material to present successive panes of filler material in the groove beneath the electron beam.

3. The welding machine in accordance with claim 1, further characterized by
said arm being of a length and width to extend said polar pieces into a groove with the ratio of its depth to its width being at least equal to 10.

* * * * *